April 7, 1942.    H. W. GRAU    2,278,923
ICE CREAM BAR MAKING MACHINE
Filed Sept. 16, 1940    3 Sheets-Sheet 1
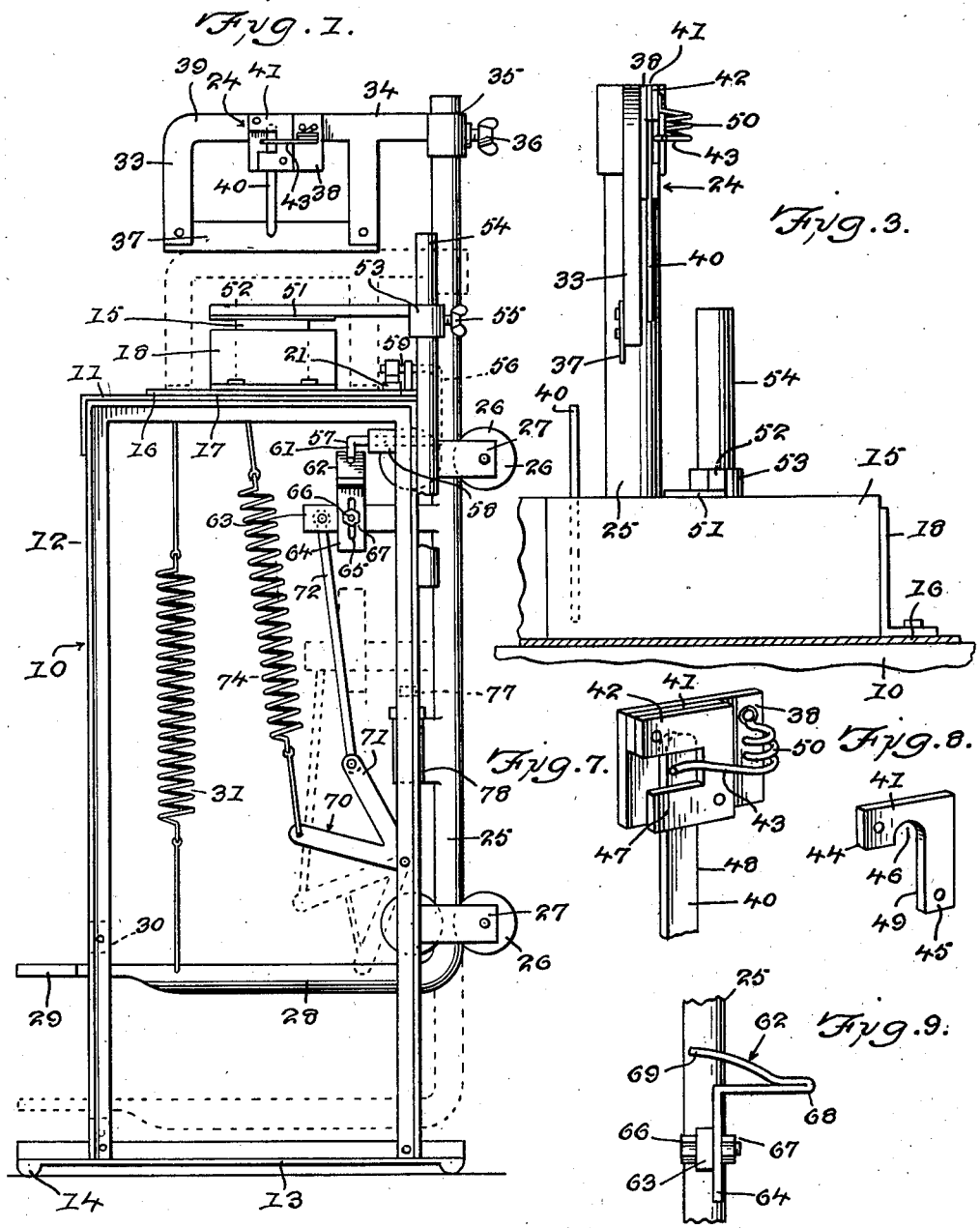
Henry W. Grau
INVENTOR
BY Victor J. Evans & Co.
ATTORNEYS April 7, 1942.   H. W. GRAU   2,278,923
ICE CREAM BAR MAKING MACHINE
Filed Sept. 16, 1940   3 Sheets-Sheet 2
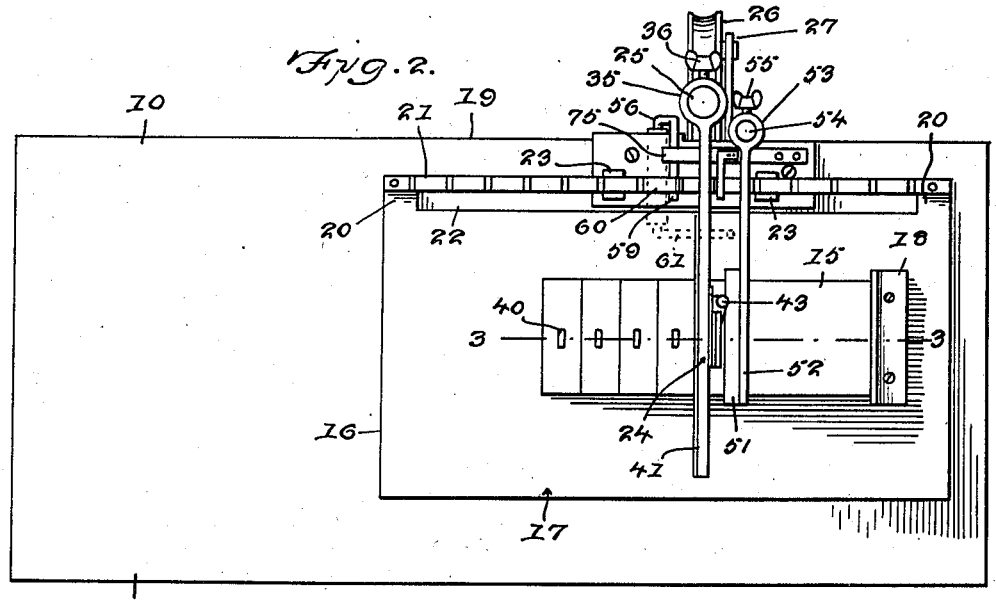
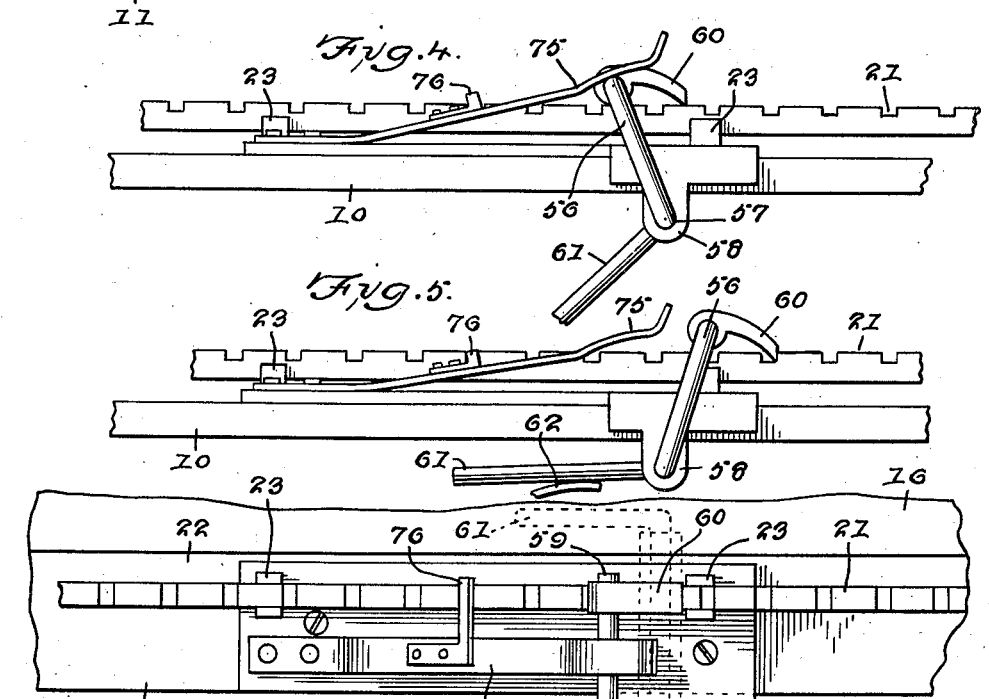
Henry W. Grau
INVENTOR
BY Victor J. Evans & Co.
ATTORNEYS April 7, 1942. H. W. GRAU 2,278,923
ICE CREAM BAR MAKING MACHINE
Filed Sept. 16, 1940 3 Sheets-Sheet 3
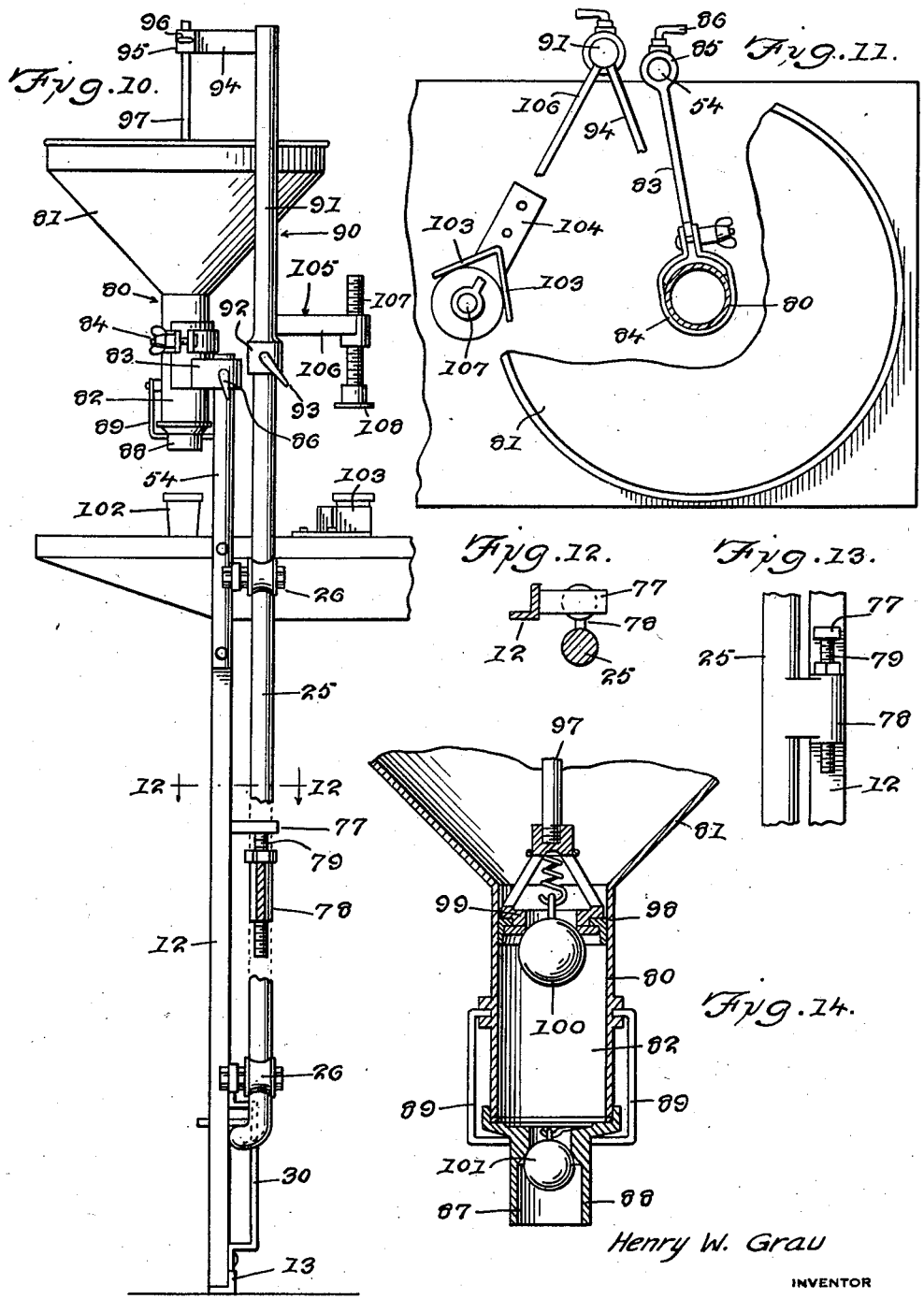
Henry W. Grau
INVENTOR
BY Victor J. Evans & Co.
ATTORNEYS Patented Apr. 7, 1942

2,278,923

UNITED STATES PATENT OFFICE 2,278,923

ICE CREAM BAR MAKING MACHINE

Henry W. Grau, Louisa, Va.

Application September 16, 1940, Serial No. 357,034

6 Claims. (Cl. 107—8)

My invention relates to new and useful improvements in confection forming apparatus.

An important object of my invention is the provision of a device adapted to cut briquettes of a confection from an elongated bar of the confection as the same is moved along a supporting surface and to automatically insert pegs or handles in the briquettes simultaneously with the cutting operation.

Another object of my invention is the provision of a device of the above-mentioned character that is light and compact and which may be manually operated, provision being made for intermittently advancing a predetermined portion of the confection bar, each advance of the bar being made when both the cutting and pegging mechanisms are inoperatively disposed.

Still another object of my invention is the provision of a device of the above-mentioned character wherein the size of the individual briquettes to be severed from the bar may be selectively regulated and wherein the advancing and pegging mechanisms will operate with equal efficacy upon the varying sizes of briquettes.

A still further object of my invention is to provide a machine to perform the purposes set forth with energy supplied by a foot lever, the foot lever being supplied with a reciprocating force adapted to equalize the needs of the reciprocating movement of the lever assembly.

Other objects and advantages of my invention will be apparent during the course of the following description.

In the drawings, forming a part of this specification, and wherein like numerals are employed to designate like parts throughout the same:

Figure 1 is an end elevation of a confection cutting and pegging apparatus embodying my invention, Figure 2 is a top plan view thereof.

Figure 3 is a fragmentary transverse sectional view taken on the line 3—3 of Figure 2, Figure 4 is a fragmentary side elevation of the pawl and rack mechanism embodying a part of my invention and showing the pawl in a retracted position, Figure 5 is a view similar to Figure 4 but showing the pawl in the advanced position, Figure 6 is a fragmentary top plan view of the pawl and rack mechanism, Figure 7 is a perspective view of the confection pegging device and illustrating the clamping head adapted to detachably hold one end of a peg to be inserted in the briquette of confection, Figure 8 is a perspective view of a plate embodying a part of the clamping head, Figure 9 is fragmentary front elevation of the leaf spring abutment carried by the actuator rod and imparting movement to the pawl and rack mechanism, Figure 10 is a rear elevation showing a confection dispensing and capping attachment applied to the cutting and pegging apparatus, Figure 11 is a top plan view of the dispensing apparatus showing parts broken away for clearness of illustration, Figure 12 is a transverse sectional view taken on the line 12—12 of Figure 10, Figure 13 is a fragmentary front elevation of the adjustable stop means for regulating the travel of the reciprocating actuator means, and Figure 14 is a fragmentary vertical sectional view of the discharge chamber of the confection dispensing hopper.

In the accompanying drawings, wherein for the purpose of illustration, is shown a preferred embodiment of my invention, the numeral 10 designates a table having a flat horizontally disposed top 11 supported by upright leg members 12. The table is adapted to support the various operating parts of my device and is, therefore, of a height adapted to best position the operating parts within easy access of the operator. Generally speaking the vertical legs 12 should be of sufficient length to position the table top at a level with or slightly above the waist of the operator. The table may be constructed of any suitable material, however, light weight angle-iron has been found to be highly satisfactory in that a table of compact structure that is at once light in weight and readily transportable is obtained. In order that the lower ends of the legs may not mar or scratch the supporting surface I have provided horizontal lower members 13 which bridge the lower ends of the legs. These lower members are also preferably of angle-iron formation, one web thereof being arranged horizontally and below the legs and the other web thereof being vertically disposed and overlying the inner faces of the legs to strengthen and support the same. The horizontal web of each of the lower members is provided at its opposite ends with rubber cushions 14 which hold the metallic parts spaced above the supporting surface and which act to prevent the metallic parts from marring the same as well as prevent the table from inadvertently sliding thereacross.

The invention contemplates, in part, the provision of a confection machine which forms a substantially rectangular briquette confection, preferably ice cream, and which is adapted to insert a peg into the briquette, which peg extends from one end of the briquette and facilitates the eating of the same. It is my intention to provide an arrangement wherein an elongated bar of the confection may be moved longitudinally along the table top 11 and wherein the operator by a single motion may sever a briquette of a predetermined size from the bar, insert a peg into the next briquette to be severed from the bar and advance the bar a sufficient distance so that the pegged briquette may be severed from the bar upon the next operation of the device.

In carrying out these operations a bar of confection 15 is placed on the base plate 16 of the carriage 17 which is slidably mounted on the table top. The bar may be of any selected length its cross-sectional area being the same size as the size of the briquettes to be formed and it is initially placed with one end in abutting relation with the vertically disposed backing plate 18 carried by the base plate. The plate is provided adjacent the rearward side 19 of the table with ears 20 which extend adjacent the opposite ends thereof and support the rack bar 21. The ears are of substantially greater length than the width of the rack to provide an elongated internal slot 22 which receives one of the spaced pairs of upstanding lugs 23 embracing the rack at spaced intervals along its length. This arrangement permits the carriage to have a limited sliding movement along the top of the table which movement is determined by the length of the slot 22 and the initial distance of the lugs 23 from the adjacent end of the slot.

In the initial operation, the carriage is moved to position the bar of confection a maximum distance away from the cutting and pegging mechanism 24 which is mounted for vertical reciprocation relative to the table a sufficient distance from the end thereof to permit the carriage to be retracted a sufficient distance to position the adjacent end of the bar of confection in advance of the mechanism. The knife mechanism includes a vertical actuator rod 25 which operates between spaced pairs of rollers 26 journalled on brackets 27 extending from the framework of the table. The lower end 28 of the rod extends forwardly the full width of the table and the extremity 29 thereof is flattened to provide a treadle which projects beyond the front legs 12 in a manner to be easily accessible to the foot of an operator standing in front of the table. The guide 30 is bolted, or otherwise secured, to the adjacent leg 12 and the treadle is received thereby in a manner to be guided in the vertical reciprocation of the rod, which rod is normally held in an elevated position by the coil spring 31.

When in the elevated poistion the rod extends substantially above the table top and the cutting and pegging attachment 24 is detachably connected thereto. This attachment comprises a U-shaped bracket 33 having a longitudinal extension 34 at one end thereof which terminates in a sleeve 35 slidably receiving the upper end of the reciprocating rod 25. A set screw 36 extends through the sleeve and engages the rod to hold the bracket fixedly associated therewith. As best illustrated in Figure 1, the spaced arms of the bracket hang downwardly in the direction of the table and the knife 37 is arranged in bridging relation therewith and with the opposite ends thereof bolted, or otherwise secured, thereto.

Experience teaches that the peg may be best inserted in the briquette before it is severed from the bar and, in order that one briquette can be pegged and another cut from the bar, I combine these two operations in the attachment 24. The base plate 38 is bolted to one side of the bracket base 39 and forms a supporting surface for the pegs 40. One end of the peg is detachably held in pressed engagement with the outer surface of the plate and this operation is accomplished by the superposed plates 41 and 42 and the spring arm 43. As best illustrated in Figure 8, the intermediate plate 41 is formed with a horizontal arm portion 44, a vertical arm portion 45, and a notch 46 at the juncture of the arms adapted to accommodate the extremity of the peg. The outer plate 42 is of the same size and shape as the plate 41 but the notch 46 is omitted and the lower end of the vertical arm is provided with a lateral extension 47 which overlies the outer side of the peg adjacent the lower marginal edge of the plate 38. By reason of the underlying relation of the plate 41 the extension 47 is disposed in spaced parallel relation with the plate 38 and the notch is covered to form a downwardly opening pocket. The end of the peg is first inserted into the notch 46 which serves to hold the peg so that the same may be pivotally introduced between the plate 38 and the extension 47 until the adjacent edge 48 thereof abuts the edge 49 of the intermediate plate 41. When thus positioned the peg will be normally disposed relative to the table top and to the top surface of the bar of confection. The spring arm 43 includes a coil portion 50 one end of which is fixedly secured to the base plate 38. The coil portion is maintained in a slightly tensioned condition at all times to resiliently press the spring arm against the portion of the peg extending between the upper and lower horizontal arm portions of the plate 42.

A holding plate 51 wipingly engages the upper surface of the bar of confection and is supported thereabove by the arm 52, the distal end of which arm is provided with a sleeve 53 which slidably receives the portion of the supporting rod 54 projecting above the table top 11. The supporting rod 54 is bolted, or otherwise secured, to the rearward side of the table slightly in advance of the reciprocating rod 25 and the set screw 55 permits the holding plate to be vertically adjustable relative to the table top to accommodate varying sizes of confection bars.

In order that a step by step motion may be imparted to the carriage 17 and in order that uniform briquettes may be produced with each operation of the device, I have provided a mechanism for actuating the carriage which mechanism is operated by the reciprocating rod 25 and in conjunction with the cutting and pegging mechanism. A U-shaped rod 56 has the lower arm 57 thereof journalled in the horizontal bearing 58 disposed below the table top slightly rearwardly of the vertically reciprocating rod 25. When thus positioned the upper arm 59 overlies the rack bar 21 of the carriage and the pawl 60 pivotally carried thereby is held in engagement with the toothed upper surface of the rack. The end of the arm 57 extending through the bearing is provided with an angularly disposed extension 61 which engages the adjustable stop element 62 mounted on the lug 63 extending inwardly from the reciprocating rod 25. The extension is engaged by the stop only when the same approaches the upper extremity of its travel and is entirely disengaged therefrom when the reciprocating rod is operating at the lower extremity of its travel. As best illustrated in Figures 1 and 9, the stop includes a vertical arm 64 provided with an elongated slot 65 which receives the screw-threaded stud 66 projecting laterally from the lug. The nut 67 is threaded onto the stud and against the arm 64 to hold the same in a selected vertically adjusted position. The portion 68 of the arm extending above the lug is bent outwardly at substantially right angles thereto and back upon itself to form the essentially springy stop arm 69 which arm engages the extension 61 as the reciprocating rod 25 approaches the upper limit of its travel to pivot the rod 56 within its bearing.

In order that the upstroke of the reciprocating rod may not depend wholly upon the resilient action of the spring 31 I have provided an auxiliary spring actuating means which comprises a bellcrank lever 70 the apex of which is pivoted to the frame below the lowermost position reached by the lug 63. The arm 71 of the bellcrank lever is connected to the lug by a rigid link bar 72 and the arm 73 thereof is connected to the framework of the table by the coil spring 74.

In operation, the carriage is first retracted so that the bar of confection will be disposed entirely in advance of the cutting plate 37. The end of the bar from which the briquettes are to be first severed should, however, abut the adjacent face of the knife blade. Thus, when the operator places his foot on the treadle 29 and depresses the reciprocating rod 25 the cutting and pegging mechanism will be lowered and the peg 40 carried by the pegging attachment 32 will be driven vertically into the bar of confection. The portion of the stick held by the attachment will project above the bar of confection and the imbedding of the peg within the confection will effect sufficient adhesion therebetween to pull the held end of the peg from the attachment. The spring arm 43 must, therefore, be of a requisite strength calculated to normally held the peg against the plate 38 but sufficiently weak to release the peg after the same has been imbedded in the confection.

Obviously, the downward movement of the rod will also effect the tensioning of the springs 31 and 74. As the lug 63 moves downwardly to the dotted line position in Figure 1, the rigid link bar 72 will pivot the bellcrank lever 70 to the dotted line position and the spring 74 will be tensioned accordingly.

As hereinbefore described, movement of the reciprocating rod to the lowermost position will cause the spring stop 62 to move to a position substantially below the extension 61 of the carriage operating bracket. The extension is sufficiently weighted to pivot the rod 56 when released by the stop 62 and to cause the pawl to ratchet freely over the rack. The distance travelled by the pawl is preferably substantially equal to the distance between adjacent teeth of the rack which teeth are spaced apart a distance equal to the thickness of the briquette of confection to be severed from the bar. As best illustrated in Figure 4, ratcheting of the pawl in the above manner will cause the arm 59 of the rod 56 to engage under the leaf spring 75 and to lift the same slightly to disengage the stop lug 76 carried thereby from the rack bar. As illustrated in Figure 5, the spring 75 is released by the rod 56 as the pawl swings forwardly to advance the carriage. The stop lug will then drop onto the rack bar and into the postjacent tooth recess to effectively limit the advancement of the carriage to the predetermined distance, however, such advancement will not be effected until the reciprocating rod 25 approaches the upper limit of its travel to bring the spring stop 62 into engagement with extension 61. When such engagement is effected the cutting and pegging mechanism will have been elevated to a position substantially above the bar of confection so that the bar may be slidably actuated therebelow without contacting therewith.

The rack bar is preferably detachably carried by the carriage plate so that the thickness of the briquettes severed from the confection bar may be regulated by providing racks the teeth of which are spaced varying distances apart. The spring arm 69 of the stop 62 permits the same to yield slightly if the stop lug 76 drops into a tooth before the rod 25 has reached the upper limit of its movement and prevents any of the actuating parts from buckling or breaking. The manner in which the spring stop 62 is adjustably mounted on the lug 63 permits the same to be positioned to rock the rod 56 a distance determined by the particular rack 21 being used. Obviously, if the teeth of the rack are spaced a relatively great distance apart the pawl will be required to make a longer stroke than if the teeth are spaced a relatively slight distance apart. The spring stop 62 may be easily and rapidly adjusted in accordance therewith and the spring arm 69 thereof will yield to correct any slight inaccuracies in the adjustment of the stop. As the lower arm 73 of the bellcrank lever swings upwardly during the upstroke of the reciprocating rod 25 it will approach a horizontal position so that the tensioned spring 74 may operate with a maximum of efficiency.

In order that the upper travel of the reciprocating rod 25 may be selectively regulated I have provided an adjustable stop the details of which are best illustrated in Figures 12 and 13. The lug 77 projects from the vertical leg of the table adjacent the rod 25 and the bearing 78 projects from the rod below the lug. The bearing is disposed slightly below the lug when the rod is at the upper limit of its travel and a screw-threaded bolt element 79 is carried by the bearing, which element projects above the bearing and engages the stop. Obviously, by moving the bolt element upwardly or downwardly within the bearing the upward travel of the rod may be selectively controlled.

It may thus be seen that the operator accomplishes all of the above outlined operations in a single actuation of the rod 25. A peg 40 is inserted in the pegging attachment after each operation of the rod and as the same is lowered a briquette is severed from the bar of confection and a peg is imbedded in the briquette next to be severed. After the rod has moved upwardly a distance sufficient to position the cutting and pegging attachments above the bar of confection the stop 62 engages the rod 56 to advance the bar of confection a distance equal to the thickness of a single briquette. Another peg is then inserted in the pegging attachment and another actuation of the rod 25 will effect a repetition of the above operation.

I have provided a confection dispensing and capping attachment for the above organization which attachments are applied to the stationary and reciprocating rods 54 and 25. First of all it is necessary that the holding plate 51 and the cutting and pegging attachment 24 be removed. This is easily accomplished by unthreading the set screws 55 and 36 and sliding the bearings 53 and 35 off of their respective rods. The dispensing hopper 80 is then detachably connected to the stationary rod 54.

The hopper comprises an upper funnel-shaped receptacle 81 the lower end of which terminates in a depending cylindrical portion 82. A supporting arm 83 is provided at its outer end with a clamp 84 which connects with the lower cylindrical portion 82 of the hopper and at its inner end with a bearing 85 which receives the rod 54. The set screw 86 carried by the bearing may be threaded inwardly to engage the rod and to hold the hopper at a selected distance above the table top. The upper end of the cylindrical portion 82 opens into the funnel-shaped portion 81 and the lower end thereof communicates with the internal bore 87 of the nozzle 88 which is detachably clamped to the lower end thereof by the spring arms 89.

After the cutting and pegging attachment has been removed from the reciprocating rod 25 the plunger attachment 90 is applied thereto. The plunger attachment comprises a vertical rod 91 the lower end of which is formed with a socket 92 adapted to receive the upper end of the rod 25 and a set screw 93 carried by the socket acts to hold the plunger rod in fixed association therewith. The upper end of the vertical plunger rod is provided with a horizontally extending arm 94 the end of which is provided with a bearing 95 and set screw 96 for holding the piston rod 97 detachably associated therewith. The piston rod extends into the funnel-shaped upper portion of the hopper and the piston 98 carried by the lower end thereof reciprocally operates within the cylindrical lower portion 82. The piston is provided with a passage 99 and the spring influenced ball valve 100 seats upwardly against the lower face thereof to close the passage when the piston is making a downward stroke. Another spring influenced ball valve 101 seats upwardly within the internal bore 87 of the nozzle to normally close the same.

A liquid confection is introduced into the hopper and reciprocation of the rod 25 in the manner previously described will cause the piston 98 to reciprocate within the cylindrical portion of the hopper. When the piston is moved downwardly the pressure created will cause the lower ball valve 101 to unseat to permit the air compressed within the cylindrical portion to be discharged therefrom. As the springs 31 and 74 cause the rod 25 to move upwardly the ball valve 101 will seat and the vacuum created in the cylindrical portion will cause the ball valve 100 to unseat whereby a quantity of the liquid confection will be introduced into the cylindrical portion of the hopper. Obviously, a second reciprocation of the rod 25 will cause the confection within the cylindrical portion to be discharged through the internal bore 87 of the nozzle and into a suitable receptacle 102 positioned therebelow and an additional quantity of the confection to be introduced therein.

After the receptacle 102 has been filled it is placed between the diverging vertical walls 103 of the positioning bracket 104 carried by the table top directly below the capping attachment 105. This last attachment comprises an arm 106 which extends from the rod 91 and carries the vertically disposed adjustable screw element 107. A capping head 108 is carried by the screw 107 which head detachably holds one or more caps of a size suited to close the receptacle 102. Thus, after the one receptacle has been filled it is properly positioned by the bracket 104 and an empty receptacle is placed below the discharge mouth of the dispensing nozzle. Reciprocation of the rod 25 will then cause a quantity of the confection to be introduced into the empty receptacle and will cause the capping head 108 to enter the filled receptacle and to place a closure cap therein. The capped receptacle is then placed to one side, the receptacle just filled is positioned below the capping attachment and an empty receptacle positioned below the dispensing hopper.

The vertically adjustable stop bolt 79 carried by the reciprocating rod 25 may be adjusted to regulate the travel of the rod in the manner hereinabove described and the travel of the rod will determine the quantity of the confection to be discharged from the cylindrical portion of the hopper. If the screw is positioned to substantially limit the movement of the reciprocating rod the travel of the piston 98 will be relatively short and a minimum quantity of the confection will be discharged from the hopper. If, on the contrary, the adjusting screw is positioned to permit the rod 25 to make a maximum stroke the travel of the piston 98 will be relatively long and a maximum quantity of the confection will be discharged from the hopper. It is thus readily apparent that any adjustment may be made between the maximum and minimum travel of the reciprocating rod to permit any selected quantity of the confection to be discharged.

Obviously, the actuating mechanism for all of the attachments is identical. Each attachment is detachably connected to its respective supporting rod so that any one thereof may be easily and expeditiously applied. The device will greatly expedite the preparation of briquettes of a solid confection or the dispensing of a desired quantity of a liquid confection.

It is to be understood that the form of my invention, herewith shown and described, is to be taken as a preferred example of the same, and that various changes in the size, shape and arrangement of parts may be resorted to without departing from the spirit of my invention, or scope of the appended claims.

Having thus described my invention, I claim:

1. In a confection machine, a cutter, means for intermittently advancing a bar of confection under the cutter, means for reciprocally actuating said cutter to sever a briquette from the end of the bar, and means carried by and coactive with the said cutter for releasably holding a peg laterally of the cutter and for driving the peg into the confection simultaneously with the severance of a briquette therefrom.

2. In a confection machine having provision for intermittently advancing a bar of confection across a supporting surface, a cutting mechanism arranged above the supporting surface for severing briquettes from the bar, a drive means for reciprocally actuating the cutting mechanism, and a clamp mounted on the cutter for detachably receiving one end of a peg the other end of which peg is adapted to be driven into a briquette during the downstroke of the cutter, the said clamp means being adapted to release the gripped end of the stick on the upstroke of the cutter.

3. In a confection machine having provision for intermittently advancing a bar of confection across a supporting surface, a cutting mechanism arranged above the supporting surface for severing briquettes from the bar, a drive means for reciprocally actuating the cutting mechanism, and a clamp means mounted on the cutter, said clamp means having a socket for receiving one end of a peg to be driven into a briquette and an extending finger piece adapted to overlie the peg a substantial distance from the socket to position and support the same.

4. In a confection machine having provision for intermittently advancing a bar of confection across a supporting surface, a cutting mechanism arranged above the supporting surface for severing briquettes from the bar, a drive means for reciprocally actuating the cutting mechanism, and a clamp means mounted on the cutter, said clamp means having a socket for receiving one end of a peg to be driven into a briquette, an extending finger piece adapted to overlie the peg a substantial distance from the socket to position and support the same, and a spring arm adapted to yieldably press against the peg to hold the same against displacement during the downstroke of the cutter but permitting release of the peg during the upstroke thereof.

5. In a confection machine, a table, an actuator element mounted for vertical reciprocation relative to the table, a cutter carried by the actuator element, a confection supporting carriage mounted for sliding movement below the said cutter and including a rack at one side thereof, a crank arm journalled on the table and having one end engaged by an extension of the actuator element, a pawl mounted on the other end of the crank arm arranged to engage the rack, and stop means actuated by the crank arm and cooperative with the rack to limit the advancement of the carriage, downward movement of the actuator element effecting severance of a portion of the confection and release of the crank arm from the extension, the crank arm being weighted to rock rearwardly to engage the stop means and to release the same from the rack, and upward movement of the actuator element initially moving the cutter to an inoperative position and thereafter bringing the extension into engagement with the crank arm to rock the same forwardly to release the stop means and to cause the pawl to advance the said carriage.

6. In a confection machine, a table, a rod mounted for vertical reciprocation relative to the table, a cutter carried by the upper end of the rod, confection supporting means mounted for sliding movement on the table top below the cutter, means for sliding the supporting means in a step by step movement and including a crank arm, a lug formed on the rod, means carried by the lug and engageable with the crank arm for actuating the sliding means, spring means normally urging the rod to an elevated position for moving the lug carried means against the crank arm and for holding the cutter elevated above confection on said supporting means, and said spring means including a bell crank lever pivoted to the table and having one arm thereof linked to the lug, a coil spring connected to the other arm of the lever and the table respectively, and a treadle formed on said rod for moving the latter against the action of said spring.

HENRY W. GRAU.